United States Patent [19]
Lee et al.

[11] 3,957,558
[45] May 18, 1976

[54] METHOD AND APPARATUS FOR MAKING A MOLDED PULP PRODUCT WITH A LIQUID IMPERVIOUS LAYER INTEGRALLY SECURED THEREON

[75] Inventors: Charles A. Lee; Warren R. Furbeck; Frederick M. Granberg, all of Knoxville, Tenn.

[73] Assignee: International Paper Company, New York, N.Y.

[22] Filed: Apr. 19, 1974

[21] Appl. No.: 462,257

[52] U.S. Cl. ............................ 156/212; 156/269; 156/287; 156/517; 156/583; 156/224; 428/64; 229/2.5 R; 162/103; 162/266
[51] Int. Cl.² ............... B29C 17/04; B32B 31/08; B30B 15/34; B32B 5/16
[58] Field of Search .......... 156/251, 224, 285, 269, 156/515, 522, 517, 583, 287; 264/90, 95; 229/2.5; 428/64; 162/103, 266

[56] References Cited
UNITED STATES PATENTS

| | | |
|---|---|---|
| 3,205,123 | 9/1965 | Hornbostel, Jr. .................. 162/103 |
| 3,318,748 | 5/1967 | Hurst .............................. 156/251 X |
| 3,539,422 | 11/1970 | Daniele .......................... 156/269 X |
| 3,616,197 | 10/1971 | Amberg et al. .................. 156/285 X |
| 3,657,044 | 4/1972 | Singer ............................ 156/285 X |
| 3,697,369 | 10/1972 | Amberg et al. .................. 156/285 X |
| 3,825,642 | 7/1974 | Kies ............................... 156/285 X |

*Primary Examiner*—Philip Dier
*Attorney, Agent, or Firm*—Fitch, Even, Tabin & Luedeka

[57] ABSTRACT

A method and apparatus are disclosed for making a molded pulp product such as a plate or the like which has an upper liquid impervious layer integrally secured thereon. The pulp product is formed on a foraminous mold and, together with the mold, is heated to the softening temperature of a liquid impervious thermoplastic sheet material which is caused to be cut to size by engagement with a cutting edge on the mold whereafter the severed portion is drawn by suction and bonded to a selected surface area of the pulp product.

8 Claims, 4 Drawing Figures

METHOD AND APPARATUS FOR MAKING A MOLDED PULP PRODUCT WITH A LIQUID IMPERVIOUS LAYER INTEGRALLY SECURED THEREON

The present invention relates generally to molded pulp products and a method and apparatus for making the same, and more particularly, to a novel method and apparatus for making a molded pulp product having a liquid impervious film layer on a selected surface area thereof.

Molded pulp products, for example, paper plates, trays and the like, have long been made by the process of matting pulp fibers in the form of a layer onto one side of a foraminous mold by the application of suction to one side of the mold while the other side is disposed in and exposed to a furnish. The deposited mat of fibers generally conforms to the configuration of the exposed surface of the mold and is usually dewatered by the application of heat and suction after leaving a furnish tank or channel to produce a self-sustaining molded pulp product.

When such a molded pulp product, and particularly a molded pulp product in the form of a paper plate or tray, is intended to receive food products and the like thereon which have a liquid or moisture content, it is desirable that the molded pulp product have a liquid impervious upper surface to prevent seepage or penetration of liquid or moisture onto the user's hands or onto other means supporting the pulp product.

The present invention is directed to a molded pulp product having a liquid impervious surface layer or film thereon, and to a method and apparatus for making such a molded pulp product. More particularly, in accordance with the present invention, a molded pulp product is formed on a foraminous mold as the mold is carried on an endless blet through a furnish channel and subjected to suction in a manner to draw the furnish against the exposed mold surface and form a fibrous layer or deposit on the mold of a desired thickness. The mold and associated pulp product are then conveyed to dewatering and drying means adapted to heat the mold and associated pulp product while simultaneously subjecting the pulp product to suction. The mold has a cutting edge formed thereon peripherally of the molded pulp product and is moved along a path for engagement with a layer of liquid impervious thermoplastic resin material, such as sheet polyethylene. The liquid impervious material is drawn against the cutting edge on the mold which, with the associated pulp product, has been heated to the softening temperature of the liquid impervious thermoplastic material. The liquid impervious sheet is drawn against the cutting edge by suction means whereby to sever a portion of the impervious material and cause it to be drawn against and bonded to the opposite exposed surface of the pulp product, with a portion of severed liquid impervious sheet being bonded to the peripheral edge surface of the pulp product.

Accordingly, it is one of the primary objects of the present invention to provide a novel molded pulp product and method and apparatus for making the same.

Another object of the present invention is to provide a method and apparatus for making a molded pulp product having a liquid impervious surface thereon by heating a foraminous mold and associated pulp product to the softening temperature of a liquid impervious thermoplastic film or sheet material, causing the thermoplastic film material to engage a cutting edge on the heated mold while simultaneously subjecting the film material to a pressure differential sufficient to sever a portion of the liquid impervious thermoplastic material from the sheet and draw the severed portion against the opposite exposed surface of the pulp product for bonding thereto.

Another object of the present invention is to provide an apparatus for making a molded pulp product, which apparatus includes novel means to apply a liquid impervious thermoplastic film material to a selected surface area of a pulp product in a highly efficient manner.

Further objects and advantages of the present invention, together with the organization and manner of operation thereof, will become apparent from the following detailed description of the invention when taken in conjunction with the accompanying drawings wherein like reference numerals designate like elements throughout the several views, and wherein.

Figure 1:
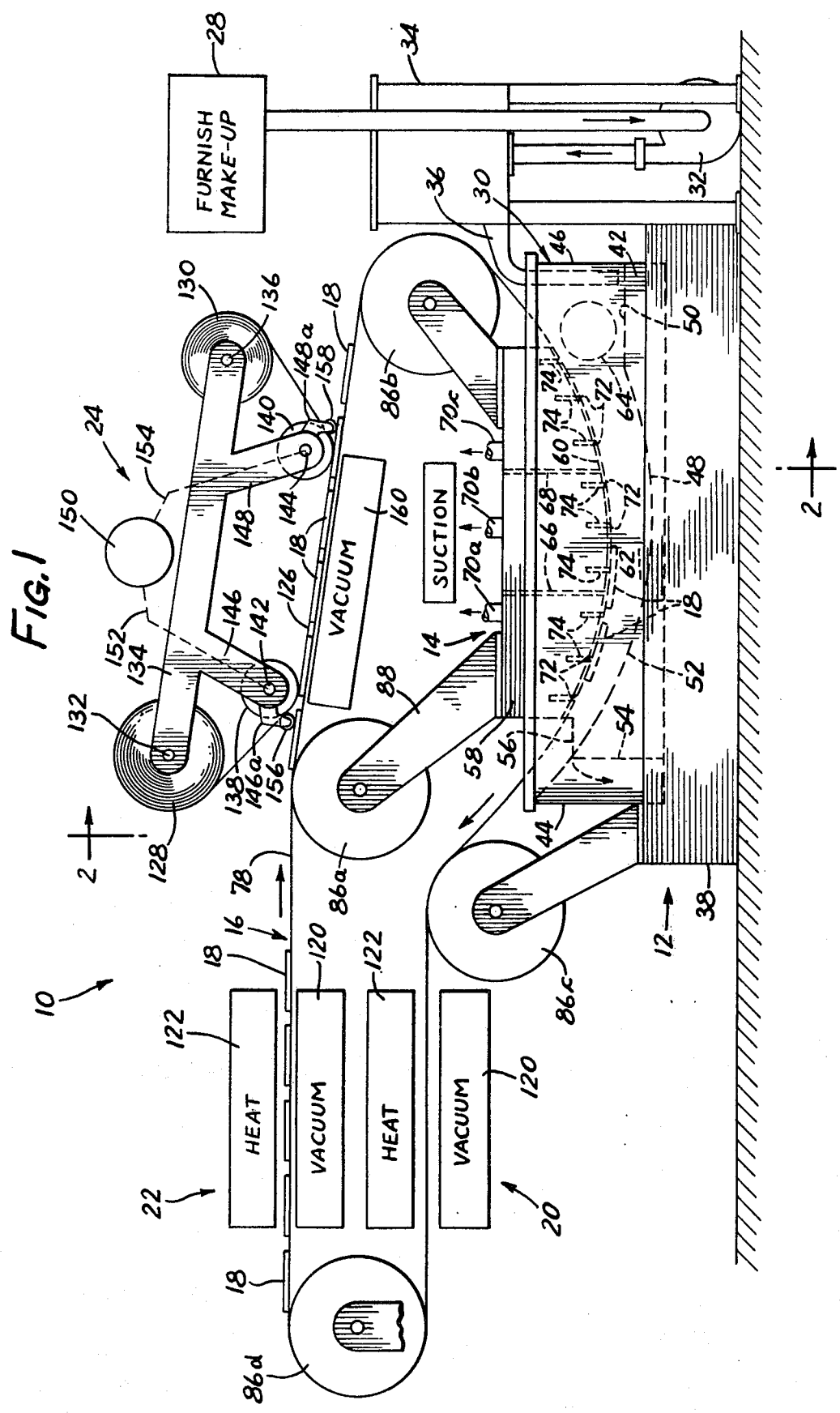
FIG. 1 is a schematic side elevational view of an apparatus for making a molded pulp product in accordance with the present invention.
Figure 3:
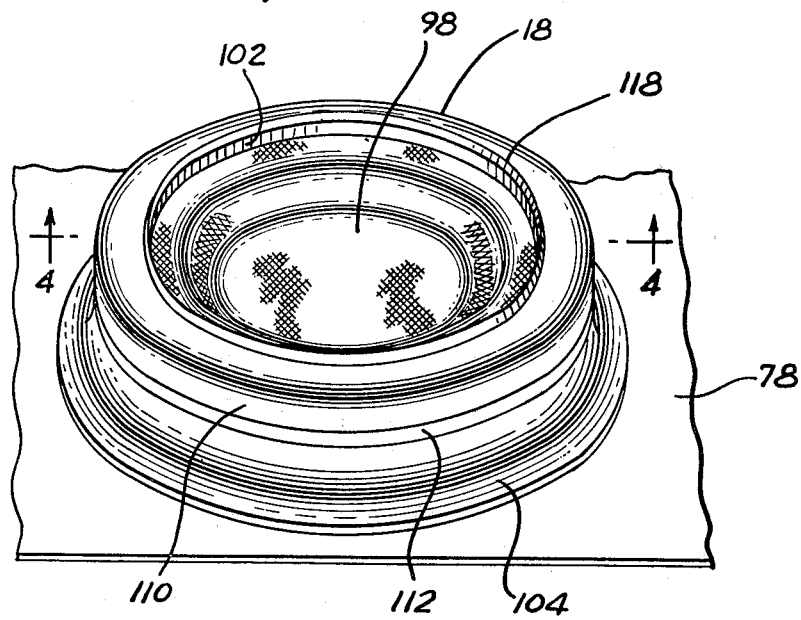
Figure 4:
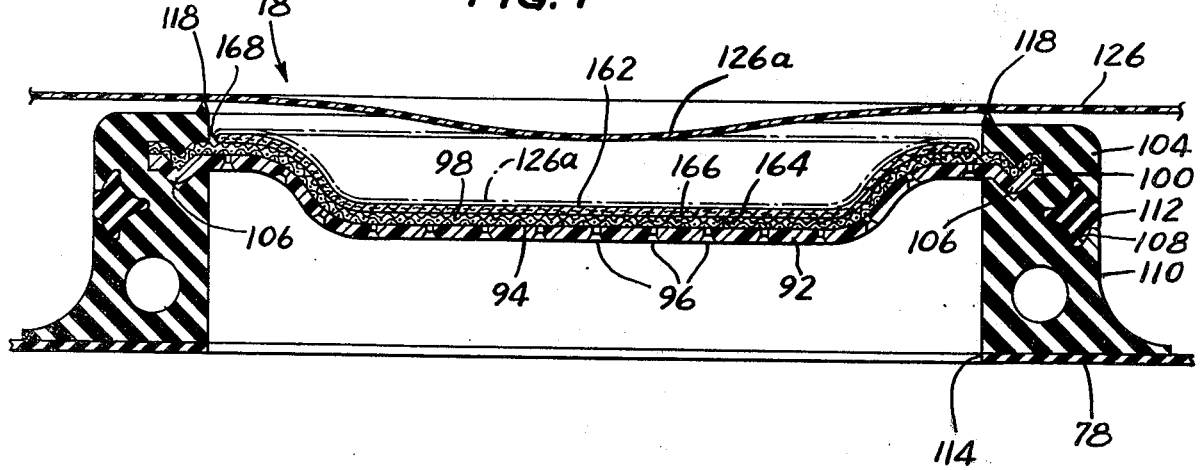

FIG. 3 is an enlarged perspective view of a foraminous mold as employed in the apparatus of FIG. 1; and FIG. 4 is a vertical sectional view taken substantially along the line 4—4 of FIG. 3 but showing the mold in cooperation with a liquid impervious thermoplastic sheet material, a severed portion of the sheet material being shown in phantom in intimate bonded contact with the opposite exposed surface of the molded pulp product carried by the mold.

Figure 2:
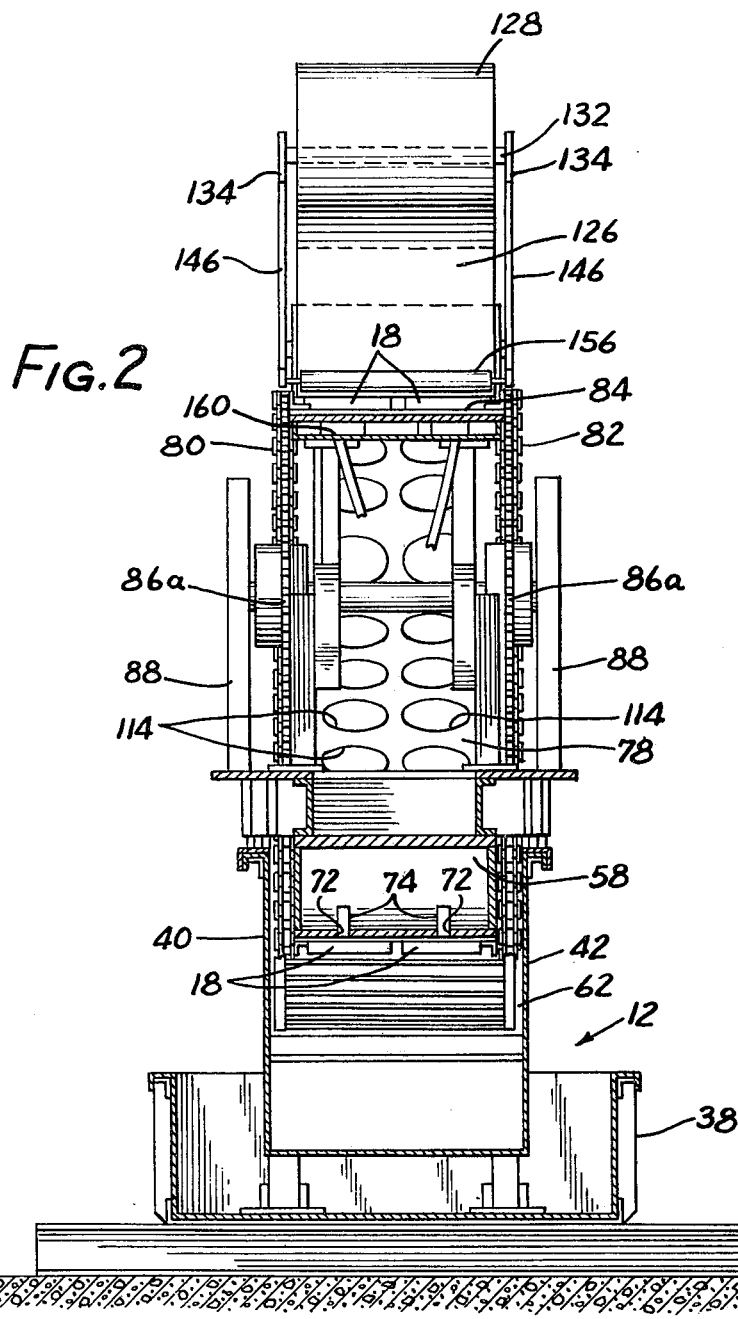
FIG. 2 is a vertical sectional view taken substantially along the line 2—2 of FIG. 1.

Referring now to the drawings, and in particular to FIGS. 1 and 2, apparatus for making a molded pulp product having a selected liquid impervious surface thereon in accordance with the present invention is indicated generally at 10. The apparatus 10 includes furnish channel means, indicated generally at 12, defining an elongated channel along which pulp furnish is caused to flow under controlled conditions; suction means, indicated generally at 14, defining an upper boundary of the furnish channel defined within the furnish channel means 12; endless belt means, indicated generally at 16, upon which is mounted a plurality of foraminous molds 18 for movement through the furnish channel means 12; dewatering and drying means, indicated generally at 20 and 22, for substantially reducing the liquid content of the molded pulp products disposed on the foraminous molds 18 after they leave the furnish channel means 12; and means, indicated generally at 24, for applying a liquid impervious film or layer to the exposed surfaces of the mold products carried on the foraminous molds 18 after leaving the dewatering and drying means 22.

The suction means 14 is adapted to draw liquid through the foraminous molds 18 when disposed within the furnish channel means 12 to effect the accumulation of pulp fibers on the foraminous molds in predetermined pulp product configurations. For purposes of illustration, the apparatus 10 will be described in connection with producing molded pulp products taking the form of paper plates.

The furnish channel means 12 includes a furnish makeup system 28 for supplying furnish to a forming tank 30 through which the furnish and foraminous molds 18 are moved concurrently to deposit a layer of pulp on the molds. A pump 32 is provided to effect flow of furnish from the furnish makeup system 28 through a conduit to a headbox 34. The furnish may be agitated within the headbox 34 which may include means to recirculate a portion of the furnish to the pump 32 for mixing with the incoming stream of furnish from the furnish makeup system 28. From the headbox 34, the furnish flows through a header 36 into the forming tank 30. Preferably, the header 36 is wide enough to deliver furnish over substantially the entire width of the forming tank 30 and terminates adjacent the bottom of the tank to minimize entrainment of air. A machine chest 38 is provided to receive overflow from the forming tank 30 and is connected through a stand pipe (not shown) to the headbox 34 in a manner to establish a preselected liquid level, and therefore a predetermined pressure head, in the headbox 34.

The forming tank 30 is generally rectangular and includes parallel side walls 40 and 42 and upstanding end walls 44 and 46. A contoured bottom wall 48 is provided interiorly of the forming tank 30 and includes a generally planar slightly downwardly inclined surface 50 adjacent the upstream end of the forming tank 30. The contoured bottom 48 also includes an arcuate portion 52 which forms a concave bottom wall extending downstream from the surface 50 to a point adjacent but spaced from the downstream end of the tank 30 generally adjacent the upstanding end wall 44. A transverse partition defining a weir 54 is provided to establish an upper liquid level, indicated at 56, of the furnish within the forming tank 30 above which the furnish overflows the furnish channel into the machine chest 38. The overflow is collected in the machine chest 38 from which it may be recirculated to the furnish makeup system 28.

The suction means 14 includes an elongated suction box 58 having an arcuate bottom wall 60 disposed centrally of the interior of the forming tank 30. Preferably the suction box 58 is of a width equal to the width of the tank 30 but, if desired, the suction box 58 may be somewhat narrower than the interior of the forming tank 30 so as to facilitate insertion or removal of the suction box as during maintenance or the like. The arcuate bottom wall 60 of the suction box 58 is disposed above and spaced from the arcuate portion 52 of the contoured bottom wall 48 of the forming tank 30 so as to define the upper boundary of an arcuate channel 62 established between the suction box bottom wall 60 and the contoured bottom wall 48 of the forming tank 30. The lateral side walls 40 and 42 of the forming tank 30 define the sides of the channel 62. At the inlet end of the channel 62 and downstream of the point at which the furnish is admitted to the forming tank 30, there is provided a distribution roll 64 rotatably mounted in transverse relation between the side walls 40 and 42 of the forming tank and which is rotated by suitable drive means (not shown). Preferably, the distribution roll 64 has a plurality of longitudinally extending rods provided in its cylindrical peripheral surface such that rotation of the distribution roll 64 enhances pulp dispersion and stabilizes and conditions the flow of furnish introduced into the channel 62.

The suction box 58 is preferably divided by generally vertically disposed transverse partitions 66 and 68 into three compartments each of which is independently connected to a source of suction (not shown) by connector conduits or pipes 70a, 70b and 70c. The three compartments into which the suction box 58 is divided establish independently controllable areas for applying vacuum to the foraminous molds 18 as they are passed through the furnish channel 62, as is known. Each of the three compartments established within the suction box 58 is preferably provided with a liquid removal system to permit removal of liquid which is accumulated in the respective compartments.

The arcuate bottom wall 60 of the suction box 58 is provided with a plurality of openings, such as indicated at 72 in FIG. 1, which communicate with the respective compartments in the suction box 58. The openings 72 are spaced over the arcuate surface 60 of the suction box 58 in a known manner to provide the desired suction action on the foraminous molds 18 as they are moved through the furnish channel 62 to draw liquid from the furnish upwardly into the suction box 58 and effect the deposit of a layer of fibrous pulp onto the respective foraminous molds 18. A stand pipe 74 is secured in upstanding relation on the upper surface of the arcuate bottom wall 60 of the suction box 58 in overlying communicating relation with each of the suction openings 72 such that liquid drawn upwardly within the suction box 58 from the furnish will be retained within the suction box for subsequent disposal or reuse as desired. Preferably, a plurality of grooves (not shown) are formed in the bottom surface of the arcuate bottom wall 60 of the suction box 58 and communicate with the respective suction openings 72 so as to channel liquid to the suction openings and thence into the respective compartments of the suction box 58 as the fibrous pulp is accumulated on the molds 18.

As noted, the apparatus 10 includes endless belt means 16 upon which the foraminous molds 18 are mounted for travel through the furnish channel means 12. While disposed within the furnish channel 62, the foraminous molds 18 are subjected to suction by the suction box 58 of the suction means 14. The endless belt means 16 comprises an endless, flexible, liquid impervious belt 78 which is of a construction to insure reasonable flexibility and stability of length. The endless belt 78 has at least one surface thereof which will develop a sliding sealing contact with the lower surface of the arcuate wall 60 of the suction box 58. The belt 78 is preferably constructed of thread or wire reinforced plastic or rubber which provides long wear and a good seal with the bottom wall 60 of the suction box 58. Belts meeting these desired characteristics are commercially available, one such belt being identified as Style 2410 distributed by Globe-Albany Felt Company of Albany, N.Y., and comprising polyester fibers impregnated with a plastisol, the plastisol being more heavily concentrated on one surface of the belt than on the other surface.

The desired seal between the endless belt 78 and the bottom arcuate wall 60 of the suction box 58 is obtained when the arcuate wall of the suction box is fabricated in an arcuate shape which is coincident with the belt catenary. It will be understood, however, that reasonable deviations from such coincidence may occur.

The belt 78 is supported by and carried through its closed loop within the apparatus 10 by means of a pair of laterally spaced link chains 80 and 82, as best seen in FIG. 2. To this end, the belt 78 is connected to and between the chains 80 and 82 by means of a plurality of transversely disposed cross bars 84 which are secured in parallel spaced relation along the length of the belt 78 in a known manner. Each of the cross bars 84 is connected at its opposite ends to the laterally spaced chains 80 and 82 as by stub shafts (not shown) which are pivotally received within appropriate links of the link chains 80 and 82.

The link chains 80 and 82 with the endless belt 78 disposed therebetween are passed over sets of laterally spaced sprockets 86a, 86b, 86c and 86d which define the course of belt travel. Each set of sprockets 86a, 86b, 86c and 86d is rotatably mounted between spaced parallel support arms, such as indicated at 88 for the sprocket 86a, which have their ends opposite the respective sprockets secured to the superstructure of the apparatus 10. Preferably, at least one set of the chain support sprockets 86a, 86b, 86c or 86d is provided with means (not shown) to adjust the associated sprockets for adjusting the tension in the chains and thus the tension in the belt 78. One or more of the sets of sprockets, such as sprockets 86a, is adapted to be rotatably driven by a suitable drive means (not shown) to effect movement of the chains 80 and 82 and associated endless belt 78 carried therebetween along the course defined by the sprocket sets, as shown in FIG. 1. As there shown, the chains 80 and 82 with the mold-carrying belt 78 disposed therebetween are trained around the sprocket set 86b, thence downwardly to effect sliding contact of a run of the belt 78 with the arcuate bottom wall 60 of the suction box 58 whereafter the chains and endless belt emerge from the pulp furnish channel 62 and are trained around the sprocket set 86c and such other sprocket sets (86d for example) as appropriate to direct the belt to the dewatering and drying stations 20 and 22 located away from the forming tank 30.

The portion of the apparatus 10 thus far described is illustrated and described in greater detail in copending U.S. patent application Ser. No. 114,514, filed Feb. 11, 1971, now U.S. Pat. No. 3,802,963.

As noted, the endless belt 78 serves to carry a plurality of the foraminous molds 18 through the path defined by the endless belt. In the illustrated apparatus 10, the belt 78 has two rows of foraminous molds 18 secured thereon in side-by-side relation so as to form pairs of molds which are spaced along the length of the endless belt 78. It will be understood that the present invention is not intended to be limited to any particular belt width nor to any particular number of foraminous molds 18 mounted on the belt for making molded pulp products.

With particular reference to FIGS. 3 and 4, each of the molds 18 includes a perforated rigid base member 92 which, in the illustrated embodiment, has a generally circular dishlike configuration so as to present a recessed surface 94 facing outwardly from the associated belt 78. The base member 92 has a plurality of fow orifices 96 therethrough which are uniformly distributed over the area of the base member 92 to provide openings through which liquid may be drawn during the deposit of pulp fibers onto the exposed surface of the mold 18 while disposed within the furnish channel 62. The orifices 96 also allow the passage of liquid therethrough during dewatering and drying of the pulp product carried on the mold after leaving the furnish channel means 12. First and second complementary screens, indicated in combination at 98, overlie the base member 92 in engagement with the upper surface 94 thereof and provide means for collecting pulp on the mold as liquid is drawn through the screens 98 and the base member 92 when the molds are disposed within the furnish channel 62, as is known.

The base member 92 and associated screens 98 have their circular marginal edge portions received within an annular groove 100 formed in the inner peripheral surface 102 of an annular mold support frame 104. The peripheral marginal edge of the base member 92 is formed to define an annular curved portion 106, considered in transverse cross section as in FIG. 4, which, together with the overlying marginal edges of the screens 98, is received within the similarly configured groove 100 in the support frame 104. As will become apparent below, the base member 92 and overlying screens 98 are releasably retained within the mold support frame 104.

The annular support frame 104 is made of a relatively flexible material, such as plastic or hard rubber, having a Durometer A hardness of approximately 80. The support frame 104 has an annular groove 108 formed in the outer peripheral surface 110 thereof, the groove 108 having a generally irregular cross sectional configuration as shown in FIG. 4. The groove 108 is adapted to releasably receive a retaining member 112 therein having a similar cross sectional configuration and preferably made of a relatively hard yet flexible material such as plastic or rubber. The retainer member 112 is adapted to be inserted into the groove 104 about the full perimeter of the support frame 104. The groove 108 is of a size and location such that when the retainer member 112 is removed therefrom, the upper portion of the support frame 104 may be manually flexed or manipulated outwardly relative to the center axis of the support frame to allow removal of the mold base member 92 and associated screens 98 from the groove 100 and thus the support frame 104 for cleaning or maintenance or the like. The base member 92 and associated screens 98 may again be assembled within the support frame 104 by manually manipulating the upper end of the annular support frame 104, inserting the marginal edge 106 of the base member 92 and screens 98 into the groove 100, and thereafter releasing the mold support frame. The elongated retainer member 112 is then again inserted into the groove 108 to prevent inadvertent flexing movement of the support frame 104 in a manner as would allow release of the base member 92 and screens 98 from the groove 100.

The support frame 104 of each mold 18 is secured to the belt 78 in overlying relation to a circular opening 114 in the belt which is of a diameter substantially equal to the diameter of the inner peripheral surface 102 of the support frame 104. The support frames 104 may be secured to the upper surface of the belt 78 by a suitable adhesive such as epoxy resin, thereby securely joining the foraminous molds 18 to the outwardly facing surface of the belt 78 without requiring projections on the side of the belt 78 which is intended to slidably engage the arcuate bottom wall 60 of the suction box 58. The material with which the support frames 104 are made allows the mold support frames to conform to the belt 78 as it is moved through the path defined by the support sprockets 86a–d.

Each of the support frames 104 of the foraminous molds 18 has an upwardly projecting cutting edge 118 which extends peripherally about the associated support frame 104. Each cutting edge 118 forms the uppermost point on the associated support frame 104 and is concentric with the inner circular peripheral surface 102 of the associated support frame 104. Each circular cutting edge 118 has a diameter slightly greater than the diameter of the inner peripheral surface 102 of the corresponding support frame 104. In one embodiment of a mold 18 for making paper plates, the inner peripheral surface 102 of the frame 104 has a diameter of approximately 9 inches, with the cutting edge 118 on the associated support frame 104 having a diameter of approximately 9-1/16 inches. The reason for this will become apparent hereinbelow.

In accordance with the apparatus thus far described, the furnish, e.g. wood fibers suspended in water, is pumped from the furnish makeup unit 28 into the headbox 34. Depending upon the product, the fibers may be of a particular kind and present in a selected quantity to provide the desired consistency. As used herein, the term "consistency" denotes the percentage, by weight, of fibrous matter in a furnish comprising fibrous matter and a liquid vehicle (normally water). In producing paper plates by the pulp molding process, the pulp fibers may comprise groundwood, reclaimed fibers and/or other types of fibers.

The quantity of furnish entering the forming tank 30 per unit of time is selected by adjustment of the pressure head at the headbox 34. The surface level 56 of the furnish within the forming tank 30 is established by selection of the height of the weir 54 at the downstream end of the furnish channel 62. Preferably, about 25% of the incoming furnish volume is caused to overflow from the downstream end of the channel into the machine chest 38 from which it may be recirculated back into the headbox 34.

As the furnish is caused to flow through the furnish channel 62, the belt 78 and foraminous molds 18 carried thereon are guided beneath the surface of the flowing furnish along the arcuate bottom wall 60 of the suction box 58. In this manner, the screen side 98 on each of the base members 92 of the foraminous molds 18 is exposed to the furnish for a selected period of time depending upon the rate of belt movement and the length of the belt course beneath the surface of the furnish. By virtue of its mounting on the belt, each mold 18 is sealingly joined at least along its periphery to the belt so as to establish fluid flow communication through the belt and mold assemblage. Since the belt 78 lies relatively flat against the bottom wall 60 of the suction box 58 in sealing engagement therewith as the molds 18 are moved through the furnish channel 62 over the suction openings 72 in the suction box 58, the partial vacuums in the respective compartments of the suction box create a suction which draws liquid from the furnish through the foraminous molds 18 to cause an accumulation of pulp fibers on the outer surface of each mold as it is exposed to the furnish. The suction box 58 is adapted to provide continuous and constant suction on the foraminous molds 18 as they travel substantially the entire arcuate length of the furnish channel 62. The molds 18 are moved forwardly through the furnish channel 62 at approximately the same rate of progression as the furnish so that relative movement between the molds and the furnish does not disrupt the fiber accumulation process. For example, the furnish may be flowed through the furnish channel at approximately 150 feet per minute (fpm), with the belt 78 and associated molds 18 being caused to travel at a rate preferably between 145 and 155 fpm.

After passing through the furnish channel 62 to form fiber accumulations on the mold 18 carried by the belt 78, the molds with their respective pulp layers thereon are passed to subsequent processing stations where the fibrous pulp products are subjected to further suction, pressure and/or heat to remove the residual moisture and produce dry self-sustaining pulp products. In the illustrated embodiment, the molds 18 are passed from the furnish channel 62 through the dewatering and drying means 20 and 22 which comprise drying stations of conventional design. Each of the drying stations 20 and 22 includes a conventional suction box 120 and a heating unit 122 which define a path therebetween through which the belt 78 and associated molds 18 are caused to pass. Each of the suction boxes 120 and associated heating units 122 serve to simultaneously heat and apply a suction to the pulp products carried by the molds 18 so as to extract a predetermined amount of moisture from the pulp products. The drying station 22 is adapted to remove substantially all of the remaining moisture in the pulp products which pass therethrough.

After the pulp products carried on the foraminous molds 18 leave the drying station 22, they are carried along on the belt 78 to the means 24 for applying a liquid impervious layer or cover film on the upper exposed surfaces of the pulp products while disposed on the molds 18. In accordance with the present invention, a liquid impervious thermoplastic sheet material 126 is adapted to be fed from a let-off roll 128 to a take-up roll 130. As shown in FIG. 1, the let-off roll 128 of thermoplastic sheet material is supported on a transverse shaft 132 having its opposite ends rotatably supported between a pair of laterally spaced support frames 134. The take-up roll 130 is supported on a transverse support shaft 136 having its ends rotatably supported by the support frames 134. The liquid impervious sheet material 126 is fed from the let-off reel 128, around a first transversely supported drive roller 138, thereafter along a run disposed parallel to the run of the belt 78 between the sprockets 86a and 86b, then upwardly about a second transversely disposed drive roller 140 to the take-up roll 130. The drive rollers 138 and 140 are of equal diameter and have axial stub shafts or axles 142 and 144, respectively, which are rotatably supported by pairs of laterally spaced support arms 146 and 148, respectively, provided on the support frames 134.

The support frames 134 may be supported in any suitable manner by the superstructure of the apparatus 10 and are positioned such that the drive rollers 138 and 140 establish a run of the liquid impervious sheet material 126 which is spaced above the endless belt 78 a distance substantially equal to the vertical height of the support frames 104 of the foraminous molds 18 carried on the belt 78. The support frames 134 are positioned so that as the molds 18 and associated molded pulp products carried thereon leave the drying station 22, the molds 18 will pass beneath the parallel run of sheet material 126 whereupon the sheet material will engage the upper cutting edges 118 on the mold support frames 104.

To effect movement of the sheet material 126 along the run disposed parallel to the belt 78 at a linear rate of travel equal to the rate of travel of the belt 78, a drive motor, indicated schematically at 150, is drivingly connected to the axle shafts 142 and 144 of the drive rollers 138 and 140, as represented schematically by mechanical connections 152 and 154. The drive motor 150 may be supported by the support frames 134 and serves to effect rotation of the drive rollers 138 and 140 at equal rotational speeds which will result in movement of the sheet material 126 at a rate of travel equal to the rate of travel of the belt 78. A pair of transversely disposed pressure rollers 156 and 158 may be supported, respectively, by support arms 146a and 148a so as to bias the sheet material 126 against the drive rollers 138 and 140. The pressure rollers 156 and 158 are adapted to maintain the necessary frictional relation of the sheet material 126 against the drive rollers 138 and 140 to prevent slippage therebetween. The pressure rollers 156 and 158 also assist in maintaining a slight tension in the run of sheet material disposed between the pressure rollers. Conventional means, not shown, may be employed to rotate the take-up roll in a direction to take up the waste sheet material 126 as necessary.

If desired, the drive motor 150 may be connected in a feedback circuit having means (not shown) controlling the rotational speed of motor 150 in response to the speed of the belt 78 so as to maintain an exacting correlation between the speed of the sheet material 126 and the speed of the belt 78.

It will be understood that alternative means may be employed to effect linear movement of the sheet material 126 between the let-off roll 128 and the take-up roll 130. For example, the take-up roll 130 may be positively rotatably driven by conventional means to effect a constant or linear speed of the sheet material 126 responsive to the speed of the belt 78.

The sheet material 126 may comprise any suitable thermoplastic film or sheet material which will form a liquid impervious layer on the upper exposed surfaces of the pulp products carried by the molds 18. For example, the liquid impervious sheet 126 may comprise a polyethylene film material of 1–2 mil thickness provided in roll form and having a transverse width substantially equal to the transverse width of the belt 78 upon which the molds 18 are carried.

A suction box 160 of conventional construction, similar to the suction boxes 120, is supported by the superstructure of the apparatus 10 to underlie the run of sheet material 126 disposed between the drive rollers 138 and 140. The suction box 160 is adapted to apply a continuous suction through the openings 114 in the belt 78 to the sides of the foraminous molds 18 opposite the sides thereof upon which the pulp products are formed as the molds 18 are carried between the suction box 160 and the overlying run of sheet material 126.

In accordance with one embodiment of the present invention, the drying station 22 is operative to heat the molds 18 and associated pulp products carried thereon to temperatures of approximately 150°–160°F during dewatering and drying. Using a polyethylene film sheet material 126, the latent heat retained in the molds 18 and pulp products as they leave the drying station 22 is sufficient to heat the polyethylene film to its softening point along the line contact established by engagement with the cutting edge 118 on a mold support frame 104 as the molds pass under the run of polyethylene disposed between the drive rollers 138 and 140. Simultaneously with the cutting edge 118 on a mold support frame 104 fully engaging the polyehtylene film or sheet material 126, the suction box 160 applies suction through the openings 96 in the base member 92 of the mold to effect a pressure differential on the liquid impervious film 126 whereby to sever or cut a portion 126a from the remaining sheet material. As the severed portion 126a interiorly of the peripheral cutting edge 118 is severed from the remaining sheet material 126, it is drawn downwardly toward the pulp product carried by the associated mold 18 to engage the upper exposed surface of the pulp product. The residual heat in the pulp product is sufficient to effect heat bonding of the severed portion 126a of the polyethylene sheet material 126 against the opposed surface of the mold product thereby providing an upper liquid impervious surface on the mold product.

With reference to FIG. 4, a molded pulp product in the form of a dish or plate shaped article is indicated at 162. The plate product 162 has a lower surface 164 adjacent the screens 98 carried on the base member 92 of the associated mold 18, an upper exposed surface 166 substantially parallel to the lower surface 164, and a peripheral edge surface 168 which interconnects the lower and upper surfaces 164 and 166, respectively, of the plate product. It has been found that when a mold 18 and associated plate product 162 leave the drying station 22, the plate product will have undergone slight shrinkage such that the peripheral surface 168 thereof is spaced radially inwardly from the inner peripheral surface 102 of the associated mold support frame 104. For a 9 inch diameter plate product, this annular clearance or spacing between the peripheral edge 168 of the plate and the inner surface 102 of the mold support 104 may be approximately 1/32 inch. In accordance with the present invention, the cutting edge 118 on the mold support frame 104 is positioned to define an interior area which will establish a severed liquid impervious sheet portion 126a of greater area than the area of the upper surface 166 on the associated plate product 162. In this manner, when the severed film portion 126a is drawn downwardly into engagement with the upper surface 166 of the pulp product 162, the severed film sheet 126a will extend in full surface contact across the upper exposed surface 166 of the pulp product, and the marginal edge of the film sheet 126a will extend around and become bonded to at least a portion of the peripheral edge surface 168 of the pulp product. Thus, as the severed polyethylene film portion 126a is heat bonded to the pulp product 162, a liquid impervious surface is provided on the annular peripheral edge surface 168 of the pulp product as well as on the upper exposed surface 166 thereof.

Depending upon the thickness of the liquid impervious sheet material 126 selected, it may be desirable to provide a backing member for the run of the sheet material 126 disposed between the drive rollers 138 and 140 to insure full surface contact of the impervious sheet material against the cutting edges 118 on the molds 18 when in underlying relation to the sheet material 126. Such backing means would additionally insure suitable suction being applied against the severed impervious sheet portion 126a to draw it downwardly against the upper surface 166 and peripheral edge surface 168 of the associated pulp product 162. To this end, an endless belt (not shown) may be reeved over the drive pulleys 138 and 140, which endless belt would have a transverse width substantially equal to the transverse width of the sheet material 126 and have an outer surface which would insure suitable release from the sheet material 126.

After severing or cutting portions of the sheet material 126 and effecting heat bonding of the severed portions with the exposed surfaces of the pulp products as described, the remaining portions of the sheet material are wound on the take-up roller 130 for subsequent recycling or appropriate disposal.

Thus, in accordance with the present invention, a method and apparatus have been illustrated and described for making a molded pulp product having a selected liquid impervious surface. While the invention has been described as providing a liquid impervious film coating for the upper surface of a molded pulp plate product, molds and products having other configurations may be readily employed within the scope of the present invention.

Thus, while a preferred embodiment of the invention has been illustrated and described, it will be obvious to those skilled in the art that changes and modifications may be made therein without departing from the invention in its broader aspects. Various features of the invention are defined in the following claims.

What is claimed is:

1. A method for applying a layer of liquid impervious thermoplastic material to an exposed surface area of a molded pulp product formed on and carried by a mold movable along a predetermined path, said mold including a foraminous base portion upon which said pulp product is formed and having a cutting edge extending around the full periphery of the pulp product formed on said base portion, said cutting edge projecting above the uppermost surface of said base portion, when considered with the mold in an upright position; said method comprising the steps of creating a run of said thermoplastic material between a let-off roll and a take-up roll along a path substantially parallel to said path traveled by said mold, heating said mold and the associated cutting edge and pulp product carried thereon to a temperature such that the latent heat of said cutting edge and pulp product is at least equal to the softening temperature of said impervious material after said heating, causing said impervious material to engage said cutting edge during movement along said run while the latent heat of said cutting edge is at least equal to the softening temperature of said thermoplastic material, subjecting the side of said pulp product opposite its exposed surface to suction simultaneously with said engagement of said impervious material with said cutting edge so that said thermoplastic material is severed by said cutting edge along the line of contact therewith to establish a severed portion of said material without moving said cutting edge toward said material, said severed portion of material being sufficient to cover the exposed surface of the pulp product carried by said mold, and heat bonding said severed portion to said pulp product by causing said severed portion to be drawn against said heated exposed surface of said pulp product by said suction.

2. A method as defined in claim 1 wherein said molded pulp product is defined by a bottom surface engaging said foraminous mold, a top surface opposite said bottom surface and substantially parallel thereto, and a peripheral edge surface connecting said top and bottom surfaces, and wherein said cutting edge defines an interior area sufficient in size so that said severed portion of liquid impervious material will engage and be heat bonded to said top and at least a portion of said peripheral edge surface.

3. The method as defined in claim 1 wherein said liquid impervious material comprises a polyethylene sheet material having a thickness of approximately 1–2 mils.

4. The method as defined in claim 3 wherein said step of heating said mold and associated pulp product comprises heating said mold and pulp product to a temperature of approximately 150°–160°F.

5. In an apparatus for making a molded pulp product having a liquid impervious surface, said apparatus including a furnish channel adapted to contain a quantity of furnish, belt means having a first run movable through said furnish channel and a second run removed from said channel, at least one foraminous mold mounted on said belt means and movable through said channel in contact with furnish therein, means associated with said channel for effecting the accumulation of fibers on said mold to form at least one pulp product thereon while said mold is disposed within said channel, the improvement wherein said mold includes a foraminous base portion defining a deposit surface on which said pulp product is formed, said mold having a cutting edge formed integral therewith and extending around the full periphery of said deposit surface, said cutting edge extending above said foraminous base portion, when considered with said mold in an upright position, said improvement further including heating means adapted to heat said mold and associated cutting edge and pulp product to a temperature at least as high as the softening temperature of said impervious material after said mold leaves said channel, a let-off roll and a take-up roll, a length of liquid impervious thermoplastic material supported by said let-off and take-up rolls for transfer from said let-off roll to said take-up roll along a path in close proximity and substantially parallel to said second run of said belt means so that said impervious material engages said cutting edge on said mold during movement of said mold along said second path, and suction box means supported adjacent said second run of said belt means and positioned to subject said foraminous base portion of said mold to vacuum from the side thereof opposite said deposit surface during movement of said mold along said second run with its cutting edge in engagement with said thermoplastic material so as to cause said thermoplastic material to be drawn against said heated cutting edge to effect severing of a portion of said impervious material and cause said severed portion to be drawn against the heated exposed surface of said pulp product on said mold to heat bond said severed portion to said pulp product.

6. An apparatus as defined in claim 5 wherein said suction box means of said apparatus positioned to engage the side of said belt means opposite the side thereof upon which said foraminous mold is mounted, said suction box means defining with said liquid impervious material a path through which said second run of said belt means is caused to travel.

7. An apparatus as defined in claim 6 including a pair of rotatable drive rollers supported in fixed relation to said let-off and take-up rolls and having their axes of rotation disposed transverse to the direction of movement of said second run of said belt means, said drive rollers having said length of thermoplastic material trained thereover for transfer from said let-off roll to said take-up roll to define a run of said thermoplastic material along said path in close proximity and substantially parallel to said second run of said belt means.

8. Apparatus as defined in claim 7 including pressure roller means operatively associated with each of said drive rollers to maintain frictional driving relation between said liquid impervious material and said drive rollers to prevent slippage therebetween.

* * * * *